(12) United States Patent
Manzato

(10) Patent No.: US 12,215,814 B2
(45) Date of Patent: Feb. 4, 2025

(54) HYDRAULIC PRESSURE RELIEF DEPRESSURIZATION VALVE ASSEMBLY FOR QUICK COUPLING

(71) Applicant: DYNAMICS DO BRASIL METALURGIA LTDA, Caxias do Sul (BR)

(72) Inventor: Fernando Manzato, Caxias do Sul (BR)

(73) Assignee: DYNAMICS DO BRASIL METALURGIA LTDA, Caxias do Sul (BR)

( * ) Notice: Subject to any disclaimer, the term of this patent is extended or adjusted under 35 U.S.C. 154(b) by 121 days.

(21) Appl. No.: 17/612,437

(22) PCT Filed: Sep. 3, 2019

(86) PCT No.: PCT/BR2019/050363
§ 371 (c)(1),
(2) Date: Jun. 2, 2022

(87) PCT Pub. No.: WO2021/042185
PCT Pub. Date: Mar. 11, 2021

(65) Prior Publication Data
US 2022/0325838 A1 Oct. 13, 2022

(51) Int. Cl.
*F16L 37/38* (2006.01)
*F16L 37/34* (2006.01)
*F16L 37/46* (2006.01)

(52) U.S. Cl.
CPC .............. *F16L 37/34* (2013.01); *F16L 37/38* (2013.01); *F16L 37/46* (2013.01)

(58) Field of Classification Search
CPC ......... F16L 37/38; F16L 37/40; F16L 37/413; F16L 37/42
See application file for complete search history.

(56) References Cited

U.S. PATENT DOCUMENTS 908,074 A * 12/1908 Cloak .................... F16L 37/40
251/149.7
5,316,041 A 5/1994 Ramacier, Jr. et al.
(Continued)

FOREIGN PATENT DOCUMENTS

WO 2008141970 A1 11/2008

OTHER PUBLICATIONS

International Search Report and Written Opinion for PCT/BR2019/050363, mailed Apr. 7, 2020.

*Primary Examiner* — Hailey K. Do
(74) *Attorney, Agent, or Firm* — Piloff Passino & Cosenza LLP; Rachel Piloff; Sean Passino

(57) ABSTRACT

The hydraulic pressure relief depressurization valve assembly for quick coupling which is object of the present invention comprises a depressurization valve assembly (100) and (200) that can be assembled in any quick coupling that has a directional body (10) and (60), generally fixed to a manifold with access to the tank (20), an intermediate sleeve (30) and (80) and a port (40) for connection to the hydraulic system, inside which is a relief valve (50) and (90), that moves axially, provided with directional holes that make it possible to relieve the pressure during the connection and disconnection action (during the manual push and pull movement), so as to minimize the pressure forces and facilitate the installation and replacement or changing of hoses on the hydraulic line.

15 Claims, 16 Drawing Sheets

(56) References Cited

U.S. PATENT DOCUMENTS

| | | | | |
|---|---|---|---|---|
| 6,840,548 | B2* | 1/2005 | Lacroix | F16L 37/42 |
| | | | | 285/308 |
| 7,007,983 | B2* | 3/2006 | Arosio | F16L 37/62 |
| | | | | 285/924 |
| 7,815,169 | B2* | 10/2010 | Arosio | F16L 37/42 |
| | | | | 137/614.04 |
| 2002/0179875 | A1 | 12/2002 | Davis et al. | |

* cited by examiner

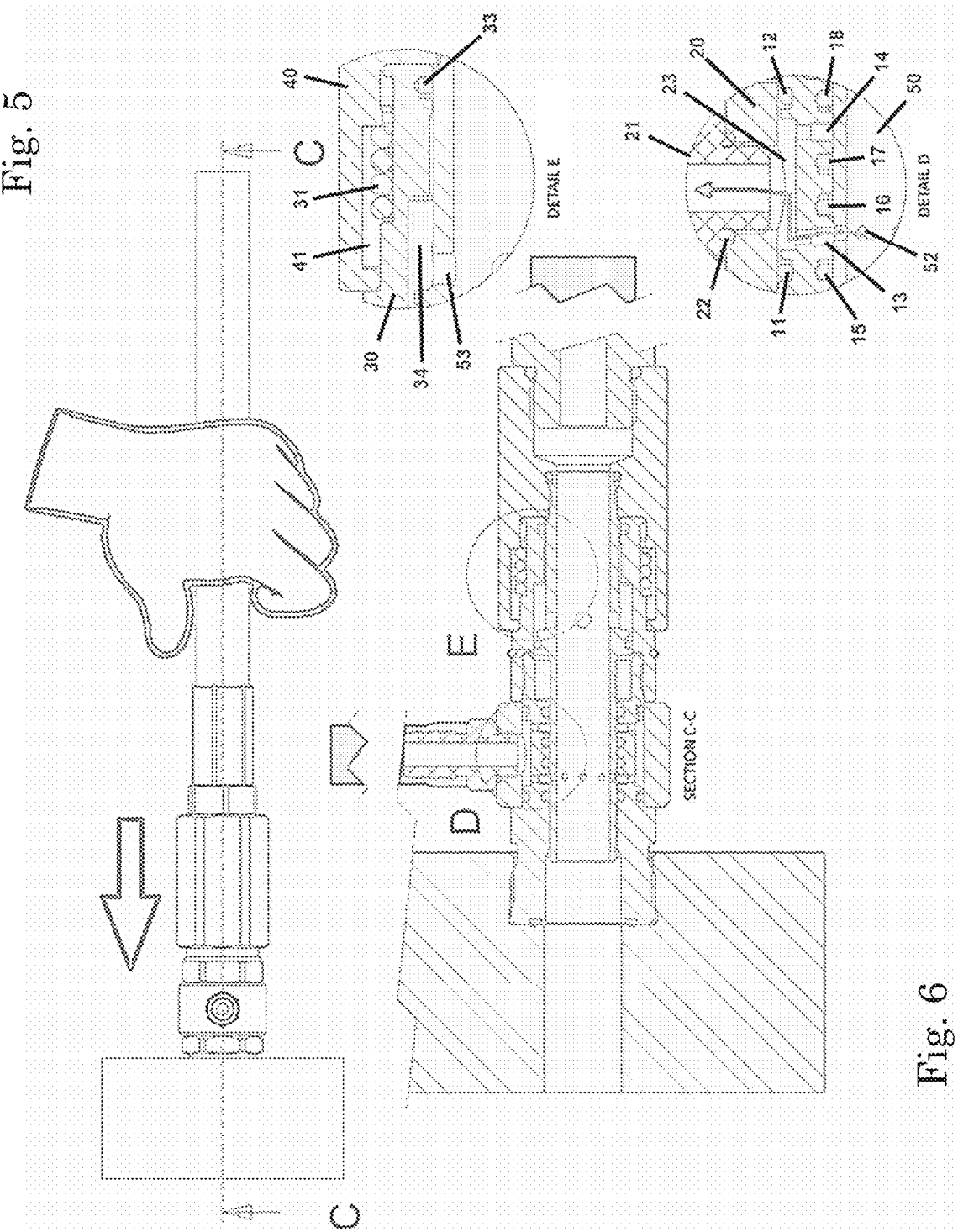

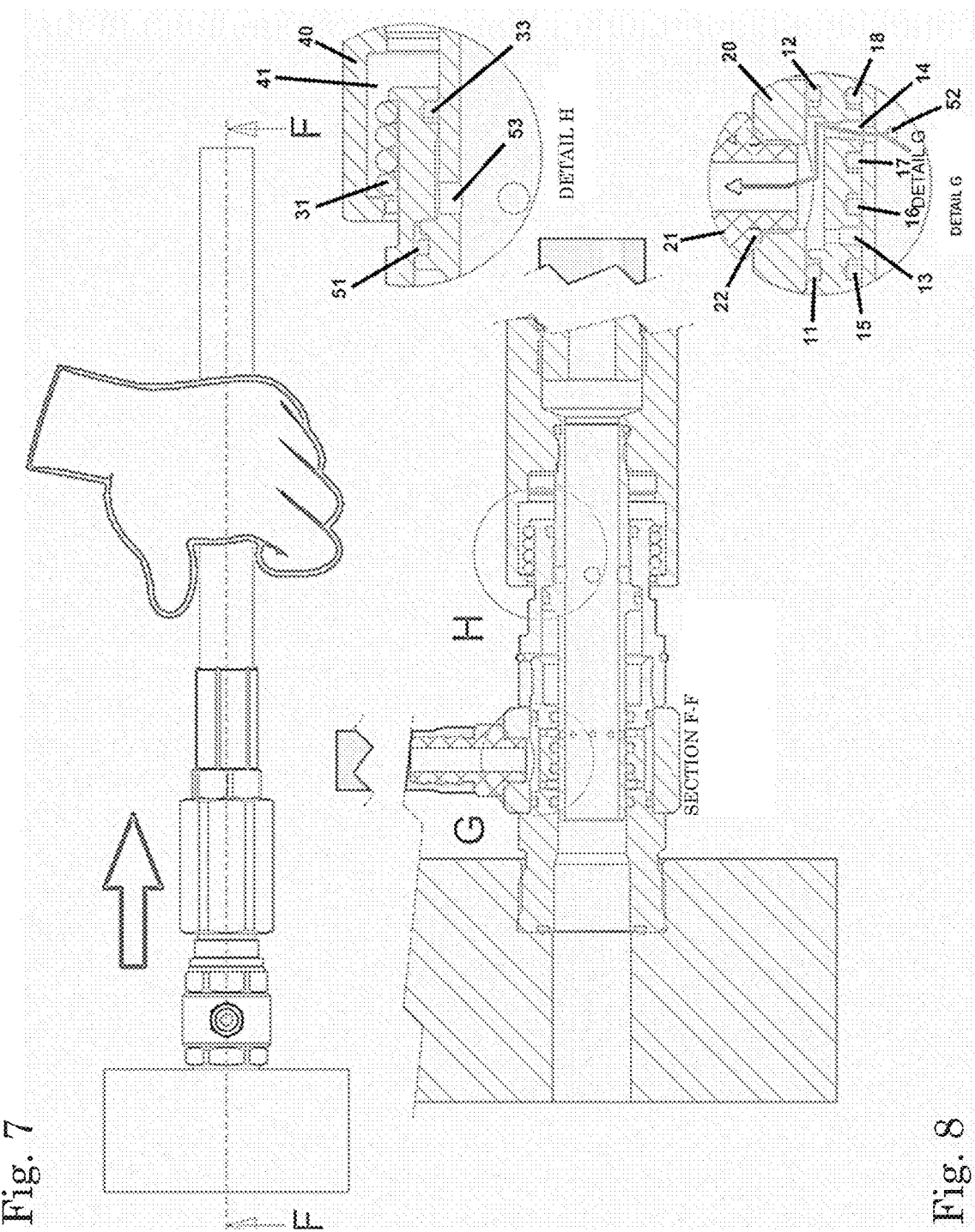

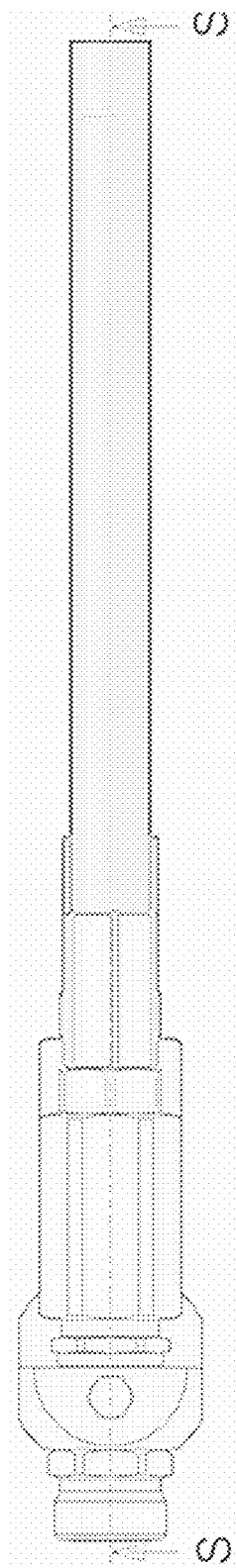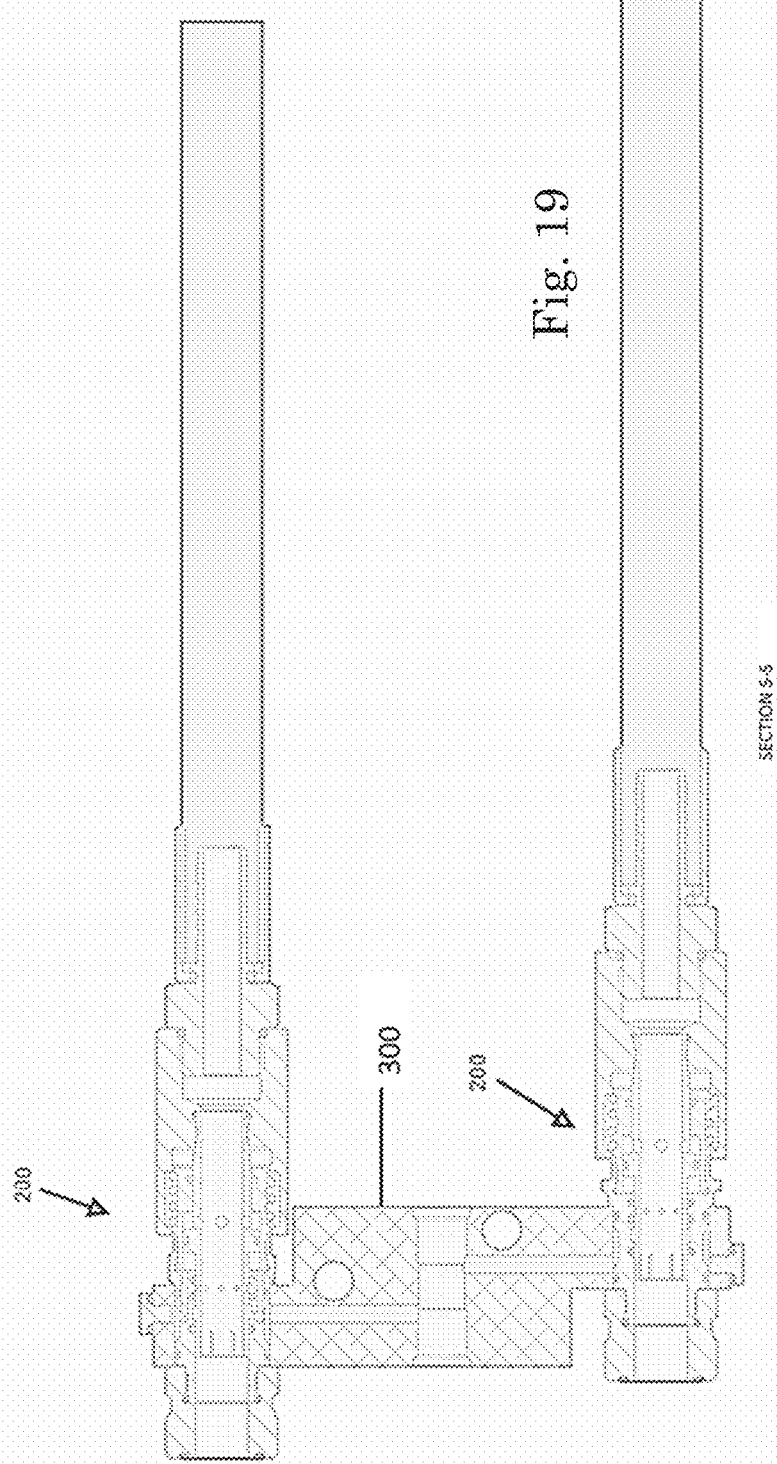

SECTION T-T

HYDRAULIC PRESSURE RELIEF DEPRESSURIZATION VALVE ASSEMBLY FOR QUICK COUPLING

FIELD OF THE INVENTION

The present invention describes a hydraulic pressure relief depressurization valve assemble that can be fitted together with any quick coupling model. More specifically, it comprises a valve assemble equipped with an innovative relief valve system, which allows the residual depressurization of the hydraulic system, allowing a quick coupling to be coupled and uncoupled to the hydraulic system without major difficulties. One of the main problems for quick coupling connection and disconnection is due to residual pressure in the line.

BACKGROUND OF THE INVENTION

Hydraulic systems are used for the generation, control and transmission of energy through pressurized fluids, and in these systems the power is transmitted and controlled through a fluid under pressure in a closed loop.

Hydraulic systems used in industrial equipment and machinery are normally equipped with a quick coupling system that allows connecting and disconnecting the fluid conduction lines without the use of special tools or devices. These couplings have specific characteristics that allow pressure relief, allowing the connection and disconnection of the two parts of the coupling (Male Part & Female Part).

However, when it is necessary to stop the hydraulic system, whether for maintenance or tool replacement, the system will remain pressurized and the disconnection or connection of the quick coupling will be complicated and heavy, and it is sometimes necessary to use tools for this disconnection, which can damage the couplings or being necessary to manipulate the lines in order to relieve the pressure and facilitate the connection.

In a search performed in the prior art, we identified several documents describing pressure relief systems applied with quick couplings, wherein we can highlight the following documents:

EP2615350 (Danelli Alessandro, Sorbi Roberto; Rusconi Paolo) describes a quick coupling that features a male fitting and a female coupling for the hydraulic connection of a pressurized fluid line. The quick coupling comprises a decompression chamber that is suitable to be filled with pressurized fluid, which acts as a hydraulic lock keeping the main valves of said male and female couplings in an opened position and is characterized by comprising a compensation system for the changes in pressure of the residual fluid remaining within said decompression chamber when said fitting no longer contains pressurized fluid.

This document cited in the prior art describes a quick coupling equipped with a compensation system for changes in fluid pressure through its own embodiment that helps to adjust the pressure in order to facilitate quick connection. However, this device has a complex embodiment that makes it difficult to manufacture and adapt to any hydraulic system, another aggravating factor being that the depressurization valve is in the same body as the quick coupling, which does not allow the use of more than one quick coupling model.

EP1431648 (Arosio Massimo) describes a quick-fit tube fitting comprising a tubular body displaceably mounted inside a tubular component and having a sealing surface extending continuously in the peripheral direction and cooperating with an annular seal. At least one discharge channel for the hydraulic fluid provided in the region of the sealing surface is connected to a tap connection. The tubular body has multiple discharge channels for hydraulic fluid. These channels have a spiral course and are distributed in a peripheral direction around the tubular body.

This document cited in the prior art describes a quick coupling tube connection that allows connection and disconnection under pressure through an annular seal arranged between two channels described in the tubular body, so that when the seal is touching the tube body, pressure is constant, and when the tube is pushed or pulled, the seal moves towards the channels in order to release the pressure contained both to connect or disconnect the device in the hydraulic line, achieving the objective of facilitating the connection and disconnection. However, this embodiment has several elements in order to present a complex embodiment that makes its manufacture difficult and that generates several inconveniences, mainly due to the need to carry out maintenance of the sealing elements, which has a great impact, as the main sealing responsible for the depressurization of the system is required in connection and disconnection, another aggravating factor is that the depressurization valve is in the same body as the quick coupling, which does not allow the use of more than one quick coupling model.

EP1179701 (Arosio Massimo) describes a flat-face quick coupling comprising an outer tubular body and threaded sleeve for receiving a tubular element, the outer circumference comprises a sealing ring element. The valve is preloaded by a spring and the valve stem comprises an extension that projects into a chamber formed between the tubular body and the tubular body, and the chamber extends to a through hole connected to a discharge connection.

This document cited in the prior art describes a quick coupling equipped with a fluid pressure adjustment system so that this system has its own embodiment that helps to adjust the pressure to facilitate quick connection. However, this device has a complex embodiment that makes it difficult to manufacture and adapt to any hydraulic system. In addition, it generates several drawbacks, mainly due to the need to maintain the sealing elements that suffer from wear over time and use.

EP1590587 (Zeiber Dennis) describes a ventable manifold provided with an actuator that resides in a longitudinal hole in the manifold body and is movable between the first and second positions. The manifold includes at least one coupler port and at least one body port for providing energized fluid to a load. A first passage is in communication with the coupler port and the body port. A second passage is in communication with a relief door and the first passage. The valve is interposed in the second passage and is in sliding engagement with the actuator cam so that when the actuator is in the first position the valve is closed so that when the actuator is in the second position the valve is open. Another modality includes a rotary actuator that can selectively relieve one hydraulic circuit or another. This document cited in the prior art describes a relief system applied in a manifold through a valve that relieves the pressure by activating clockwise or counterclockwise, in order to displace small spheres that allow directing the pressurized fluid to the tank. However, this relief valve is an independent system, which is not mounted in the line of quick couplings and for coupling or uncoupling of the coupling, it is necessary to activate the valve before such an operation, and it is often unknown by the operator who is unable to perform the connection or disconnection of the quick coupling in the movement of pushing and pulling the coupling (when the lines are pressurized). This system has two operations required for the coupling or uncoupling function.

Therefore, the present owner has developed a depressurization valve assemble for quick coupling having its own embodiment features that allow pressure relief in the connection and disconnection action, through a single depressurization direction (pushing the valve), from the hoses close to the hydraulic system, so that this new embodiment allows for greater variability in the application and installation in any hydraulic system and allows depressurization when pushing and pulling.

Thus, the object of the present invention is a depressurization valve assembly that can be mounted on any quick coupling having a directional body, usually fixed to a tank access manifold, an intermediate sleeve and a hydraulic system gantry coupling, which features internally a tubular structure, which moves axially, equipped with directional holes that allow to relieve the pressure in the connection and disconnection action (in the manual movement of pushing and pulling), in order to minimize the pressure forces and facilitate the installation and replacement or exchange of hoses on the hydraulic line.

This new embodiment allows for greater ease and agility in the connection and disconnection, under pressure, of the hoses to the hydraulic system, resulting in a more efficient quick coupling system that facilitates the installation and replacement of tools. It also allows the installation of any quick-coupling model to its structure.

SUMMARY OF THE INVENTION

The present invention features a hydraulic pressure relief depressurization valve assembly for quick coupling providing a directional fluid body, a tank access manifold, an intermediate sleeve, a hydraulic system coupling gantry and an axial displacement equalized relief valve, forming the valve assemble that allows to relieve pressure on the connecting and disconnecting action.

The present invention features a hydraulic pressure relief depressurization valve assembly for quick coupling providing a directional body with grooves interspersed with sealing elements.

The present invention features a hydraulic pressure relief depressurization valve assembly for quick coupling providing grooves that allow fluid to be directed to the access manifold either in the action of connecting or disconnecting the hose.

The present invention features a hydraulic pressure relief depressurization valve assembly for quick coupling providing a directional body attached to a manifold having an access terminal to the tank.

The present invention features a depressurizing hydraulic pressure relief valve assemble for quick coupling providing an intermediate sleeve provided in its outer portion by a groove that allows the arrangement of a spring and a groove that receives the vent protector.

The present invention features a hydraulic pressure relief depressurization valve assembly for quick coupling providing a gantry coupling that has an embodiment that is fitted and fixed over the end of the sleeve, forming a chamber that houses the spring.

The present invention features a hydraulic pressure relief depressurization valve assembly for quick coupling providing a relief valve that has a seal arranged at the central portion, a set of directional fluid holes, and a set of greater diameter valve equalization holes, in order to allow the axial movement of the valve with the valve assemble.

The present invention features a hydraulic pressure relief depressurization valve assembly for quick coupling providing a system that when the valve is moved, through the action of pushing the gantry, the holes are displaced, in order to relieve the line pressure, directing the fluid to return to the tank through the access allowing the air exiting from the chamber hole, in the action of connecting the hose to the gantry.

The present invention features a hydraulic pressure relief depressurization valve assembly for quick coupling providing a system that when the valve is moved, through the action of pulling the gantry, the holes are displaced, in order to relieve the pressure, directing the fluid to return to the tank through the access, in the action of disconnecting the hose at the gantry.

The present invention features a hydraulic pressure relief depressurization valve assembly for quick coupling providing a second embodiment of the depressurization valve assemble that comprises a block contact threaded body, a tank access manifold, a fluid directional compact body, an intermediate sleeve, a hydraulic system gantry coupling, and an axial displacement equalized relief valve.

The present invention features a hydraulic pressure relief depressurization valve assembly for quick coupling providing greater variability in the application and use of the depressurization valve, allowing this assembly to be installed on any coupling model, adding two functions to a conventional coupling (connect and disconnect under pressure).

BRIEF DESCRIPTION OF THE FIGURES

FIG. 5 shows the representation of the valve movement direction when pushing the hydraulic hose.

FIG. 6 shows the side sectional view of the installed valve assemble, detailing the positioning of the pressure relief holes when the gantry is pushed by the hydraulic hose and the positioning of the spring when the assembly is pushed.

FIG. 7 shows the representation of the valve movement direction when pulling the hydraulic hose.

FIG. 8 shows the side sectional view of the installed valve assemble, detailing the positioning of the pressure relief holes when the gantry is pulled by the hydraulic hose and the positioning of the spring when the assembly is pulled.

FIG. 18 shows the top view of the second embodiment of the valve assemble mounted on a manifold connected to a tank.

FIG. 19 shows a sectional view of the second embodiment of the valve assemble mounted on a manifold connected to a tank.

DETAILED DESCRIPTION OF THE INVENTION

Figure 1:
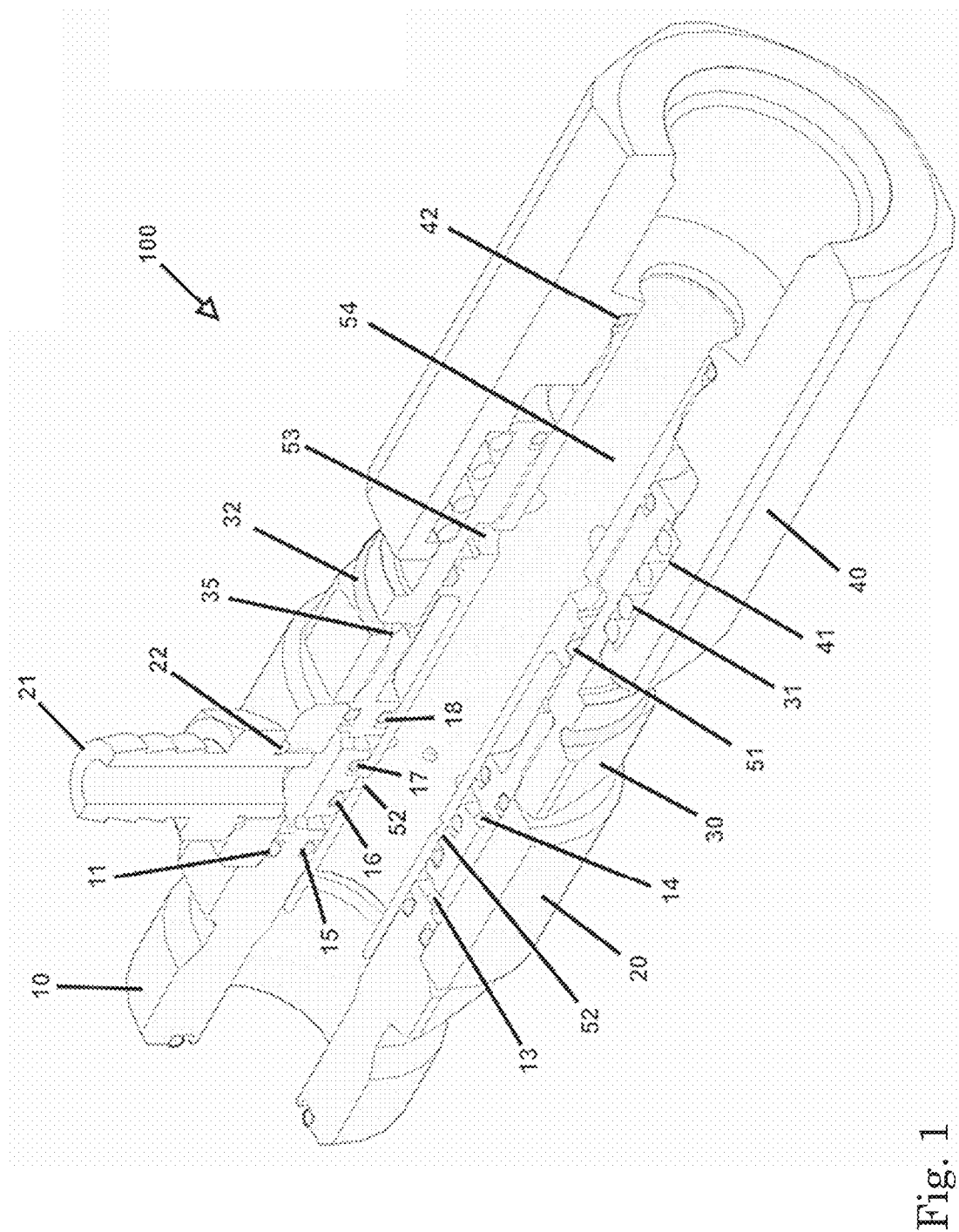
FIG. 1 shows an exploded perspective view of the valve assemble with a cross-section, detailing its construction.
Figure 2:
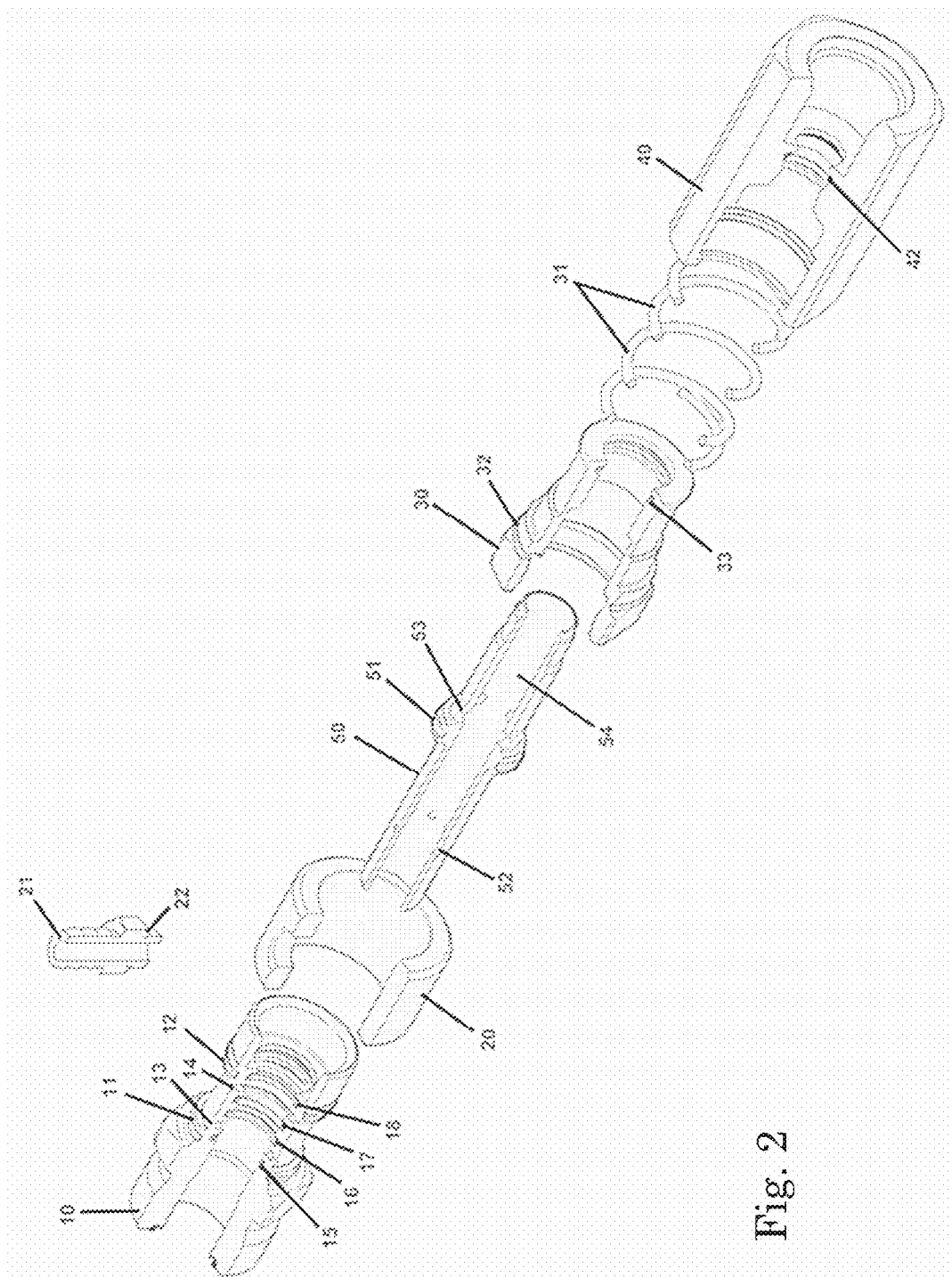
FIG. 2 shows the exploded perspective view of the valve assembly provided with a cross-section, detailing its components.
Figure 3:
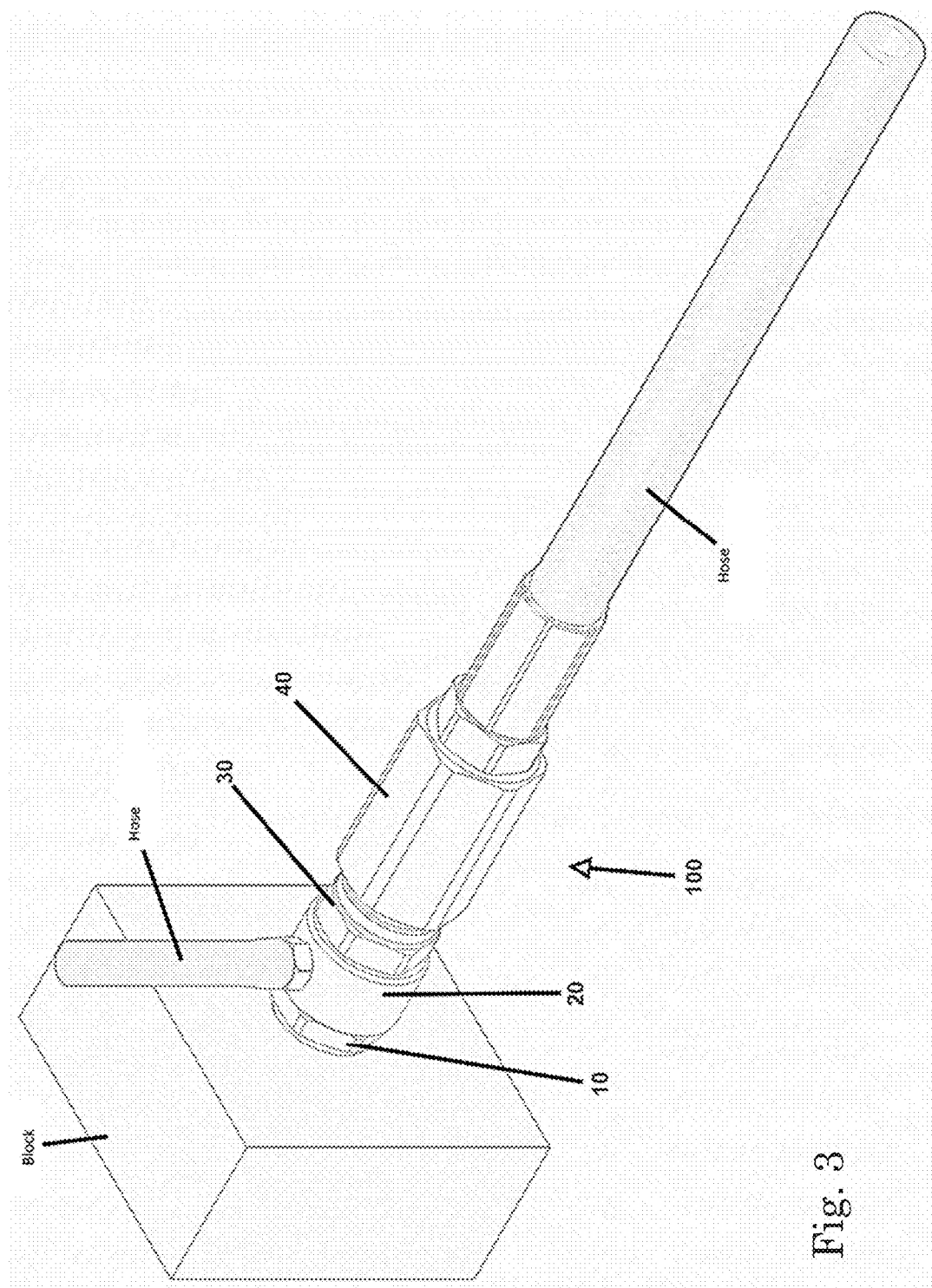
FIG. 3 shows a perspective view of the valve assemble mounted to the manifold block and provided with the hydraulic hose and tank return hose.

The hydraulic pressure relief depressurization valve assemble for quick coupling, object of the present invention, comprises a directional fluid body (10), a tank access manifold (20), an intermediate sleeve (30), a hydraulic system coupling gantry (40) and an axial displacement equalized relief valve (50), forming the valve assemble (100) that allows relieving the pressure in the connection and disconnection action, in order to minimize the pressure forces and facilitate the installation and replacement of the hoses to the line of hydraulic systems.

The directional fluid body (10) has grooves in its outer portion that enable the arrangement of sealing elements (11) and (12) together with the attachment means of the tank access manifold (20). On the inner portion of the body (10) are arranged grooves (13) and (14) interspersed by a pressurized seal (15), rear directional coupling seal (16), lower directional coupling seal (17) and depressurization safety seal (18), allowing fluid to be directed to the tank access manifold (20) through the grooves (13) and (14), either in the hose connection or disconnect action.

The tank access manifold (20) describes an upper hole that receives the access terminal (21), said terminal (21) being fitted and sealed to the manifold (20) through a sealing ring (22).

The manifold (20) is fitted over the body (10), forming a chamber (23) which is interconnected with the grooves (13) and (14) and which is sealed by the pressurized seal (15) and depressurization safety seal (18), making it possible to direct the pressurized fluid back to the tank in order to relieve the pressure at the valve.

The intermediate sleeve (30) is provided in its outer portion with a groove that allows the arrangement of a spring (31) and a groove that receives the vent protector (32). In its inner portion, it has a seal (33) arranged with the relief valve (50). The intermediate sleeve (30) is fitted and fixed over the end of the body (10), resting against the manifold (20).

The coupling gantry (40) has an embodiment that is fitted and fixed over the end of the sleeve (30), forming, with the sleeve (30), a chamber (41) that houses the spring (31). In the inner portion of the gantry (40) a sealing ring (42) is fixed to the internal structure (50).

The relief valve (50), arranged in the inner portion of the set (100), has a seal (51) arranged in the central portion a set of directional fluid holes (52) and a set of greater diameter holes (53), valve equalization, said valve (50) having in its central portion a passage section (54) of the pressurized fluid.

The sealing element (51) is arranged with a chamber (34) formed by the junction of the sleeve (30) to the body (10), in order to allow the axial movement of the valve (50) together with the assembly (100).

The chamber (34) formed by the junction of the sleeve (30) and the body (10) has a vent hole (35) arranged next to the protector (32) described on the outer portion of the sleeve (30).

The greater dimension holes (53) are arranged next to the sealing element (51) and also move within the chamber (34), and these holes are intended to equalize the pressure of the valve (50) when there is pressure in the system, preventing involuntary axial movement.

Figure 4:
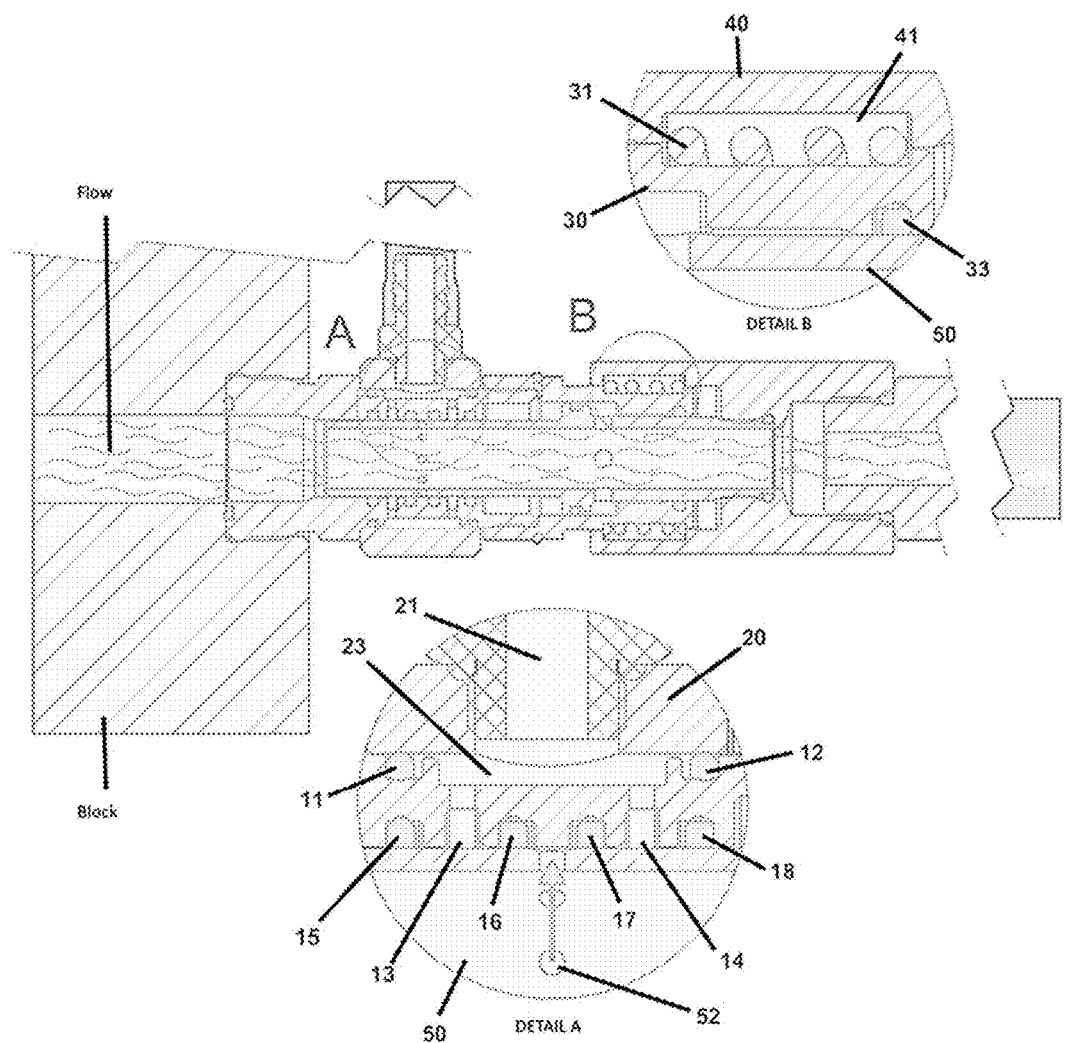
FIG. 4 shows the side view of the installed valve assemble, detailing the positioning of the pressure relief holes at rest and the spring disposition chamber.
Figure 9:
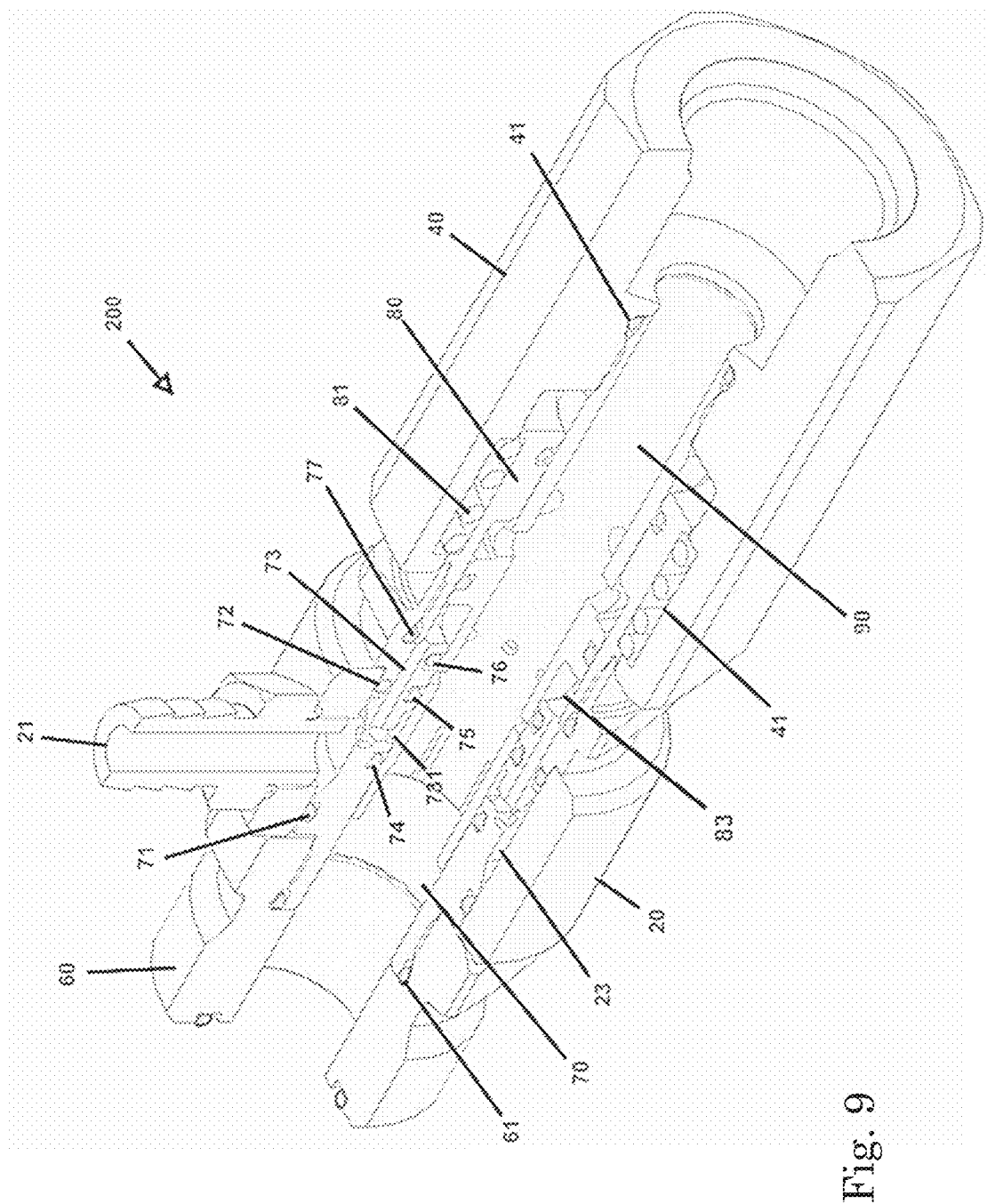
FIG. 9 shows the perspective view, in a second embodiment of the valve assemble with a cross-section, detailing its constructiveness.
Figure 10:
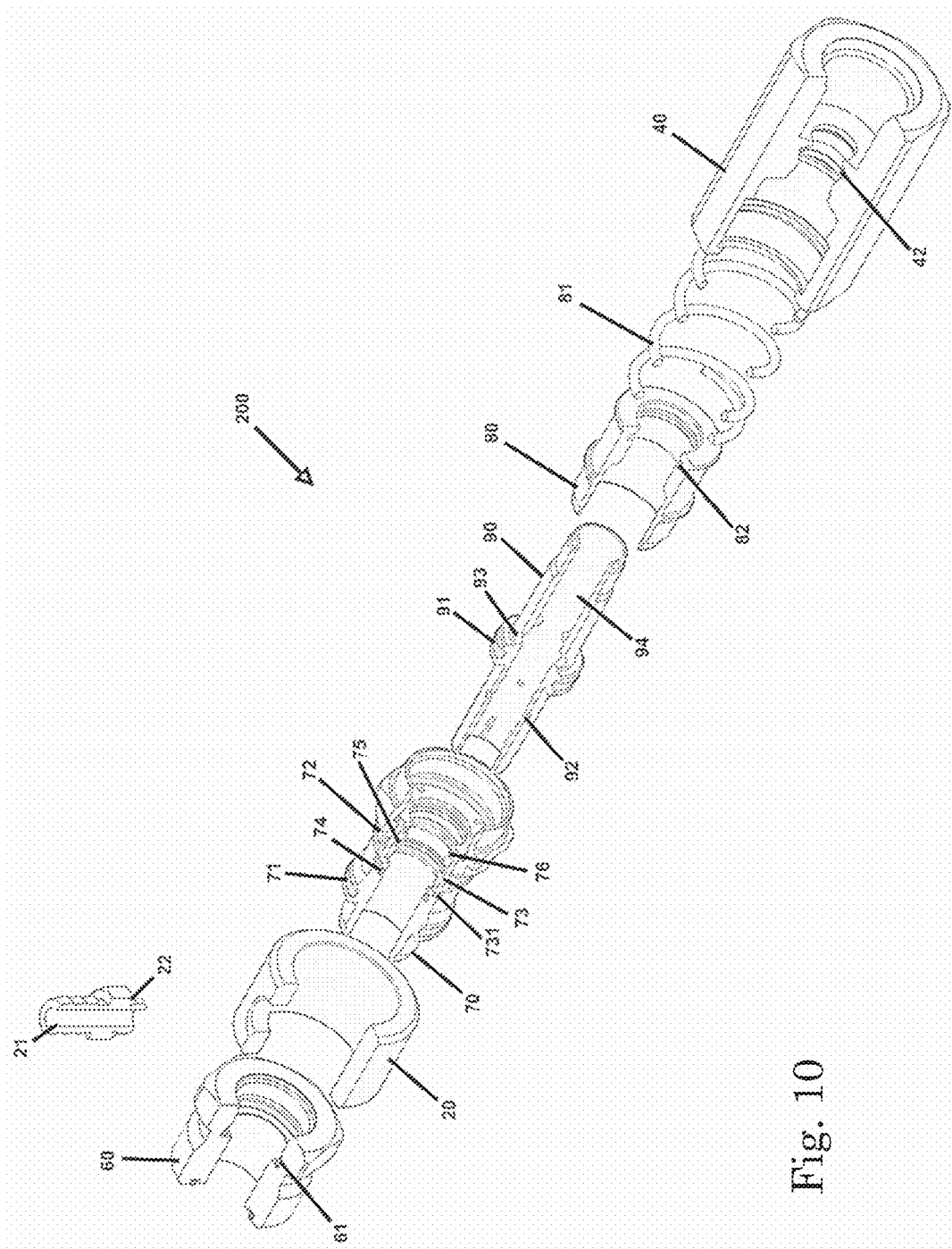
FIG. 10 shows the exploded perspective view, in a second embodiment of the valve assemble with a cross-section, detailing its components.
Figure 11:
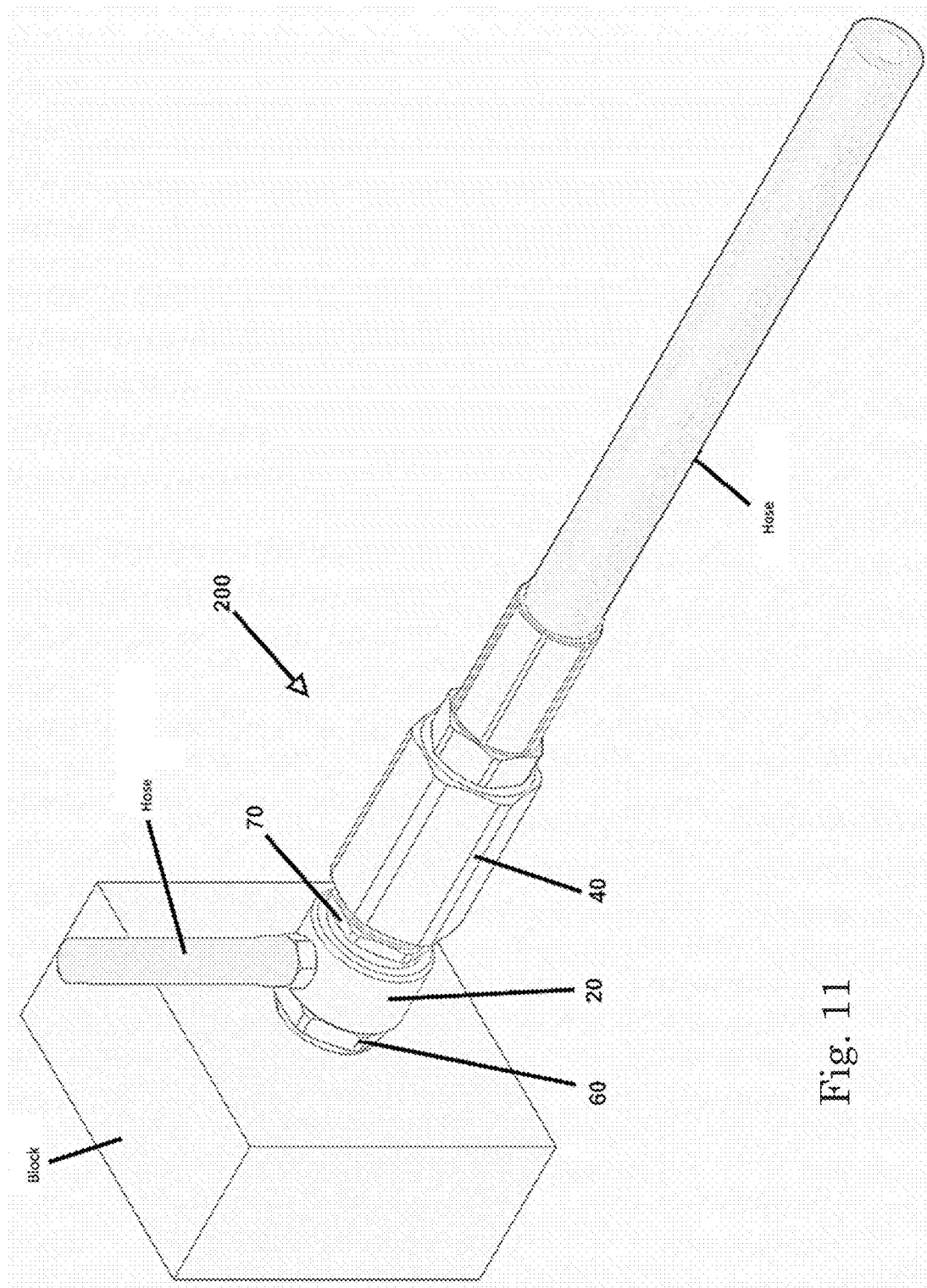
FIG. 11 shows a perspective view, in a second embodiment of the valve assemble mounted to the manifold block and equipped with the hydraulic hose and tank return hose.

The relief valve (50), when at rest, keeps the directional holes (52) aligned on the inner portion of the body (10) so that this hole is arranged between the sealing elements (16) and (17) and between the grooves (13) and (14), keeping the line pressurized, as described in FIG. 4.

When the valve (50) is moved, through the action of pushing the gantry (40), the holes (52) are displaced along the groove (13) between the sealing elements (15) and (16) and the seal (51) and holes (53) are displaced within the chamber (34) in order to relieve pressure from the line, directing the fluid back to the tank through the access (21) allowing air to exit the chamber hole (35) in action connection of the hose to the gantry (40), as shown in FIGS. 5 and 6.

When the valve (50) is moved, through the action of pulling the gantry (40), the holes (52) are displaced along the groove (14) between the sealing elements (17) and (18), in order to relieve the pressure, directing the fluid to return to the tank through the access (21) in the action of disconnecting the hose with the gantry (40), as shown in FIGS. 7 and 8.

The sealing elements (15), (16), (17), (33) and (51) can be accompanied by a backup ring.

In a second embodiment, the hydraulic pressure relief depressurization valve assembly for quick coupling comprises a threaded body (60) contacting the block, a tank access manifold (20), a directional fluid compact body (70), an intermediate sleeve (80), a hydraulic system coupling gantry (40) and an axial displacement equalized relief valve (90), forming the valve assembly (200) that allows to relieve the pressure in the connection and disconnection action, in order to minimize the forces of pressure and facilitate the installation and replacement of hoses to the line of hydraulic systems.

The threaded body (60) in contact with the manifold has an embodiment that allows the fitting and attachment of the directional fluid compact body (70), having a sealing element (61) between the fitting system.

The directional fluid compact body (70) has grooves in its external portion that allow the arrangement of sealing elements (71) and (72) with the attachment means of the tank access manifold (20). On the inner portion of the body (70) there is a horizontal groove (73) which is interconnected to the opening (731), interspersed with a pressurized seal (74), rear directional coupling seal (75) and lower directional connection seal (76), allowing fluid to be directed to the tank access manifold (20) through the groove (73), either in the connection or disconnection action of the hose.

The horizontal groove (73) is interconnected to the opening (731) of access to the relief chamber (23) and to the chamber (83) for moving the seal (91) of the valve (90).

The tank access manifold (20) describes an upper hole that receives the access terminal (21), said terminal (21) is fitted and sealed to the manifold (20) through a sealing ring (22).

The manifold (20) is fitted over the body (70), forming a chamber (23) which is interconnected to the groove (73) which is sealed by the sealing elements (71) and (72), making it possible to direct the pressurized fluid back to the tank in order to relieve the pressure of the valve.

The directional fluid compact body (70) is fitted over the intermediate sleeve (80), featuring a sealing element (77), so as not to have a vent hole due to the new embodiment of the set. In this conception there is no vent, just a chamber (83) connected to a tank.

The intermediate sleeve (80) is provided in its outer portion with a groove that allows the arrangement of a spring (81), and in its inner portion it has a seal (82) arranged with the relief valve (90). The intermediate sleeve (80) is fitted and fixed to the body (70), being sealed through the element (77).

The coupling gantry (40) has an embodiment that is fitted and fixed superimposed on the end of the sleeve (80), forming, with the sleeve (80), a chamber (41) housing the spring (81). On the inner portion of the gantry (40) there is a sealing ring (42) fixed to the inner valve (90).

The relief valve (90), located on the inner portion of the set (200), has a seal (91) arranged on the central portion, a set of directional fluid holes (92) and a set of greater diameter holes (93), valve equalization, said valve (90) having in its central portion a passage section (94) of the pressurized fluid.

The sealing element (91) is arranged next to a chamber (83) formed by the junction of the sleeve (80) with the body (70), in order to allow the axial movement of the valve (90) with the assembly (200).

The greater dimension holes (93) are arranged next to the sealing element (91) and also move inside the chamber (83), and these holes are intended to equalize the pressure of the valve (90), when the axial movement is performed.

Figure 12:
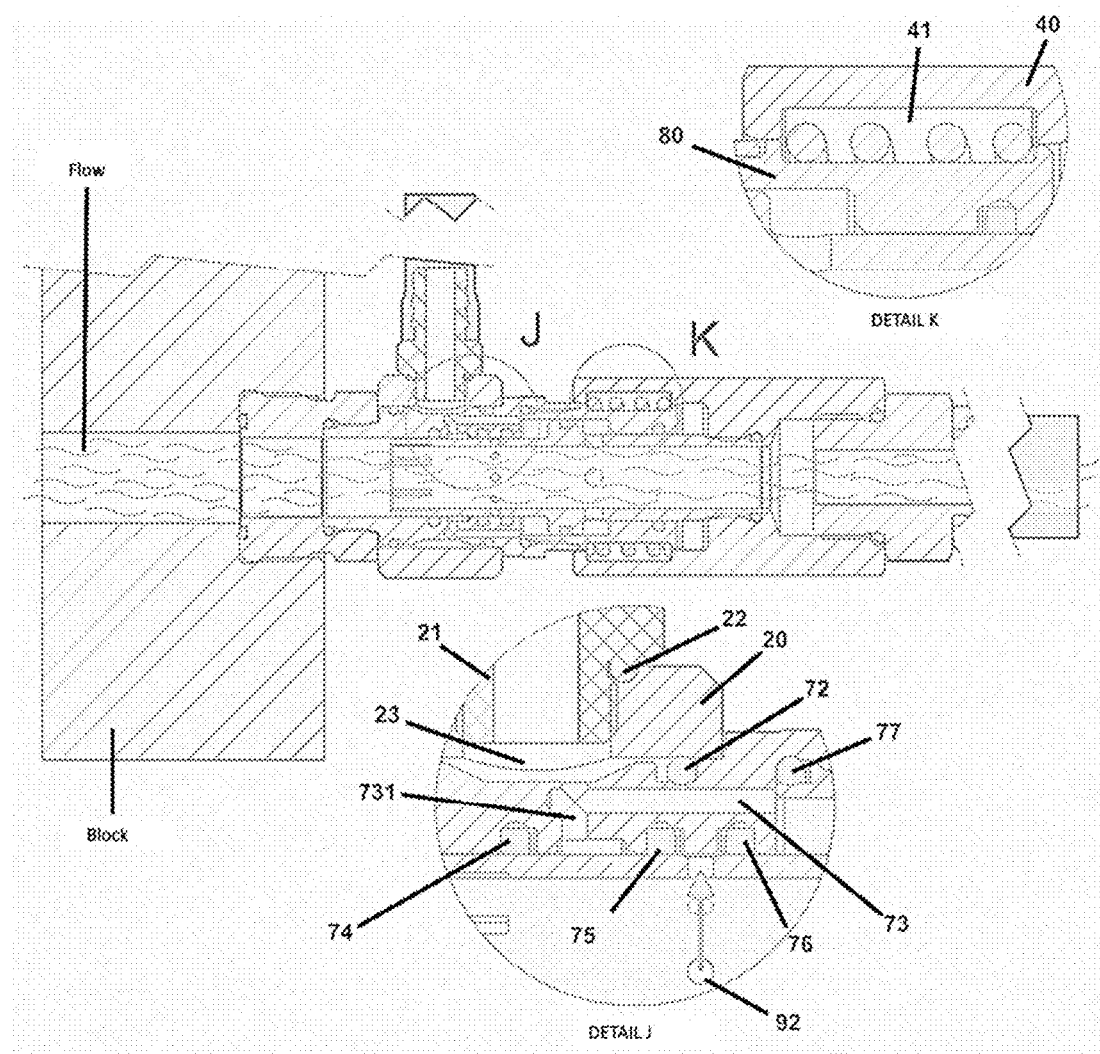
FIG. 12 shows the side sectional view, in a second embodiment of the installed valve assemble, detailing the positioning of the pressure relief holes at rest and the spring disposition chamber.
Figures 13, 14:
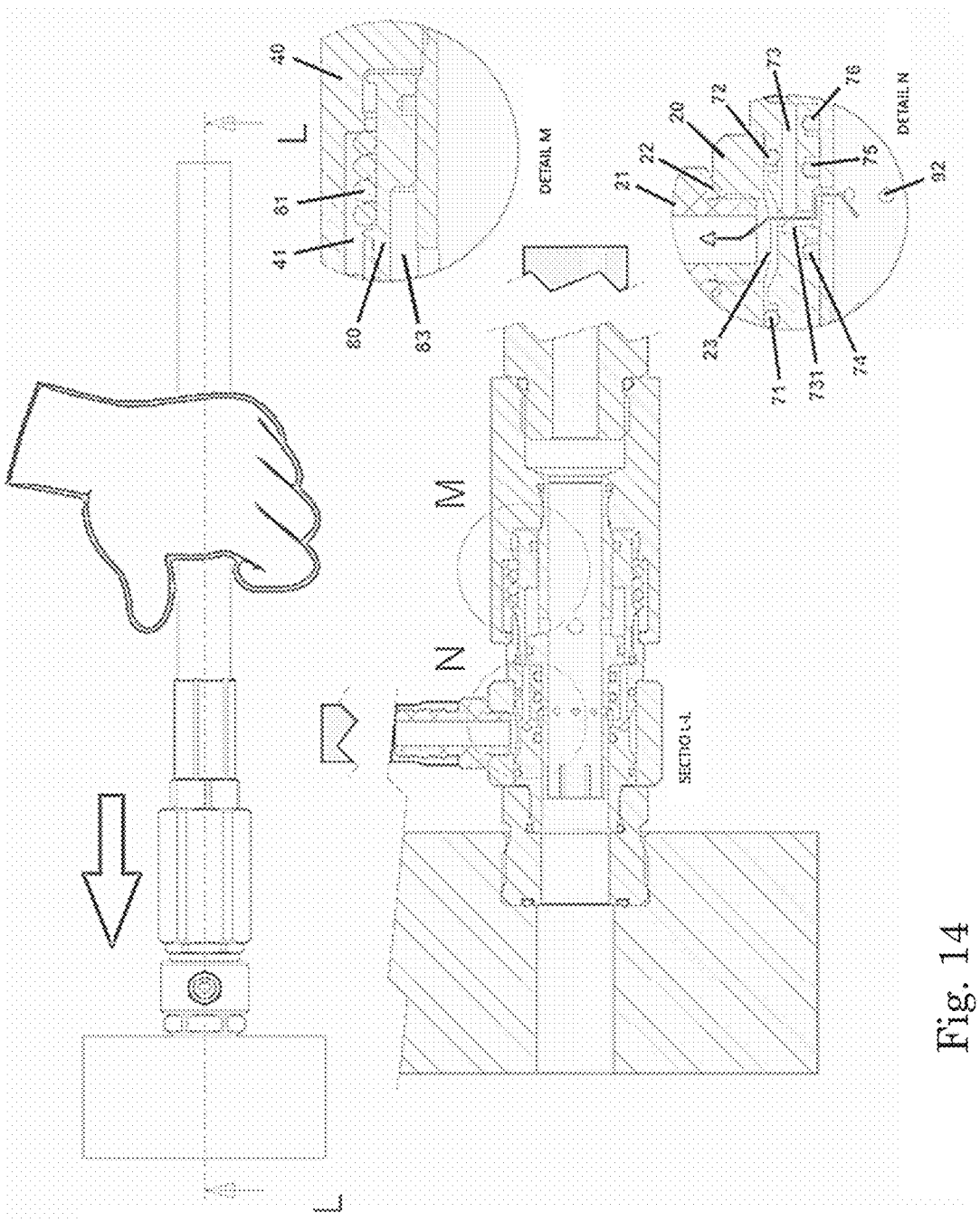
FIG. 13 shows the representation of the valve movement direction when pushing the hydraulic hose, in a second embodiment.
FIG. 14 shows the side sectional view, in a second embodiment of the installed valve assemble, detailing the position of the pressure relief holes when the gantry is pushed by the hydraulic hose and the position of the spring when the assembly is pushed.

The relief valve (90), when at rest, keeps the directional holes (92) aligned on the inner portion of the body (70) so that this hole is arranged between the sealing elements (75) and (76) and between the hole (73) and the chamber (83), keeping the line pressurized, as described in FIG. 12.

When the valve (90) is moved through the action of pushing the gantry (40), the holes (92) are displaced along the opening (731) between the sealing elements (74) and (75), directing the fluid to the horizontal groove (73) and the relief chamber (23). The seal (91) of the valve (90) closes the rear end of the horizontal groove (73) so as to prevent fluid from entering the chamber (83), relieving line pressure and directing the fluid back to the tank through the access (21).

The equalization of the valve (90) is always performed when the system is pressurized, and most time it works stopped in the neutral working position, it serves to avoid unintentionally moving the valve forward on the axial axis. Thus, if the valve (90) was not equalized, the system would depressurize whenever there was pressure.

Figures 15, 16:
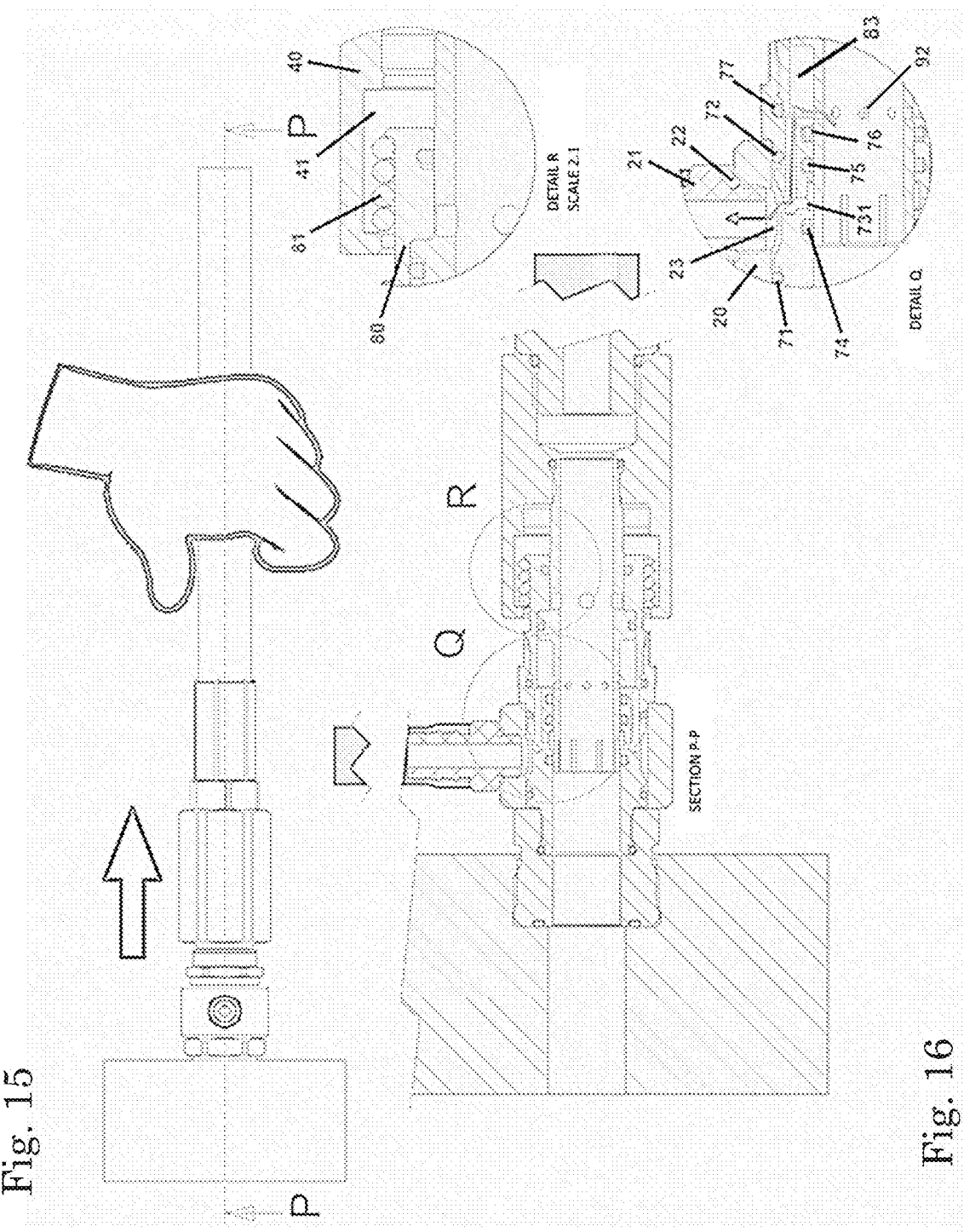
FIG. 15 shows the representation of the valve movement direction when pulling the hydraulic hose, in a second embodiment.
FIG. 16 shows the side sectional view, in a second embodiment of the installed valve assemble, detailing the positioning of the pressure relief holes when the gantry is pulled by the hydraulic hose and the positioning of the spring when the assembly is pulled.

When the valve (90) is moved, through the pulling action of the gantry (40), the holes (92) are displaced with the chamber (83) allowing the fluid to be directed to the horizontal groove (73) in order to relieve the pressure, directing the fluid to return to the tank through the access (21), in the action of disconnecting the hose with the gantry (40), as shown in FIGS. 15 and 16.

The sealing elements (74), (75), (76), (82) and (91) can be accompanied by a backup ring.

Between the depressurizing valve (100 and 200) and the hose any coupling model can be installed, even those not equipped with a system to connect and disconnect under pressure to the hydraulic system, allowing greater variability of application and use, as this new embodiment allows add two functions to a conventional coupling (connect and disconnect under pressure).

Figure 17:
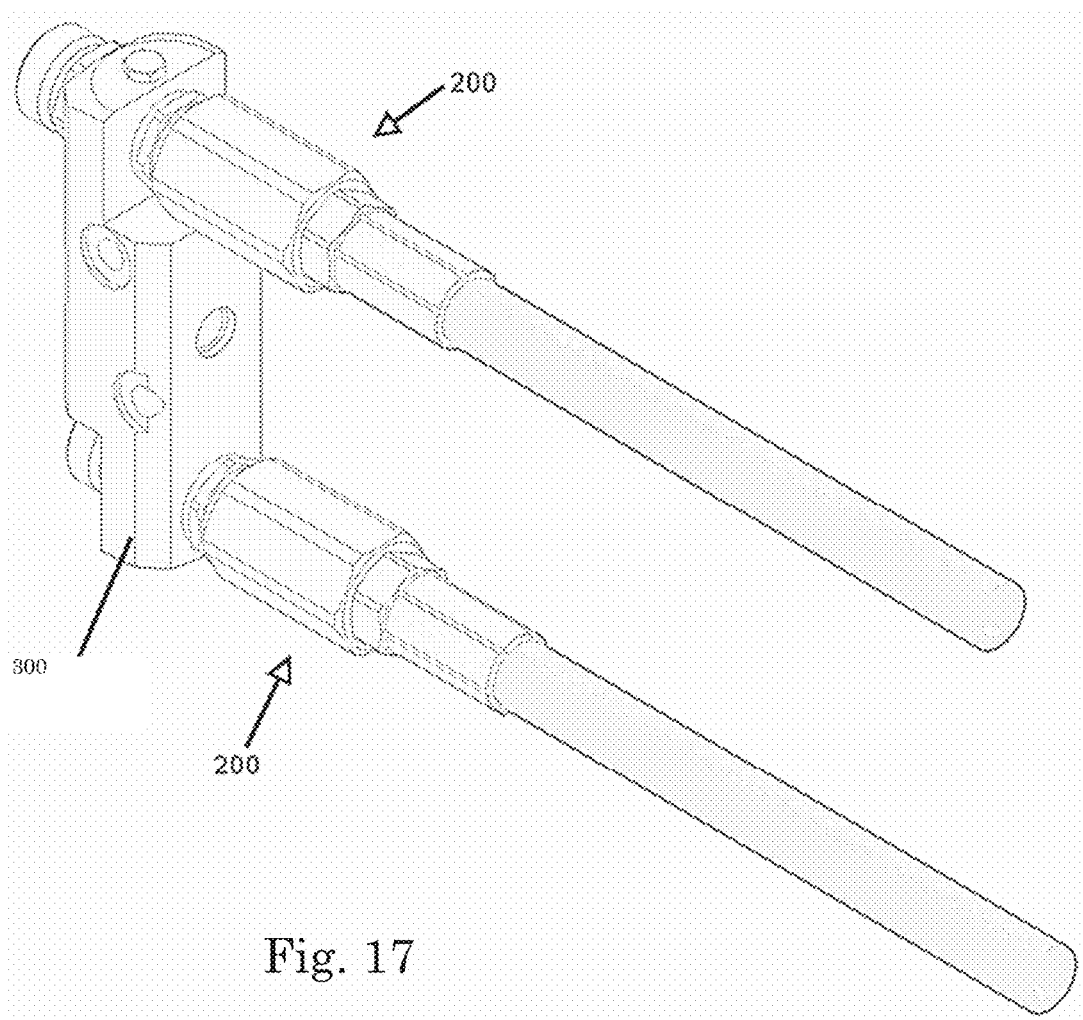
FIG. 17 shows the perspective view of the second embodiment of the valve assemble mounted on a manifold connected to a tank.

In other forms of application and arrangement of the valves (100) and (200), the manifold (20) can be removed from the assembly, so that the valves can be connected and mounted to a manifold (300) in order to reduce the amount of components, as instead of using a terminal (21) plus sealing ring (22) plus hose to return the pressurized oil to the tank this block is already in contact with the tank and does not require four parts: manifold (20), terminal (21), sealing ring (22) and hose connected to tank, as shown in FIGS. 17, 18 and 19.

Figure 20:
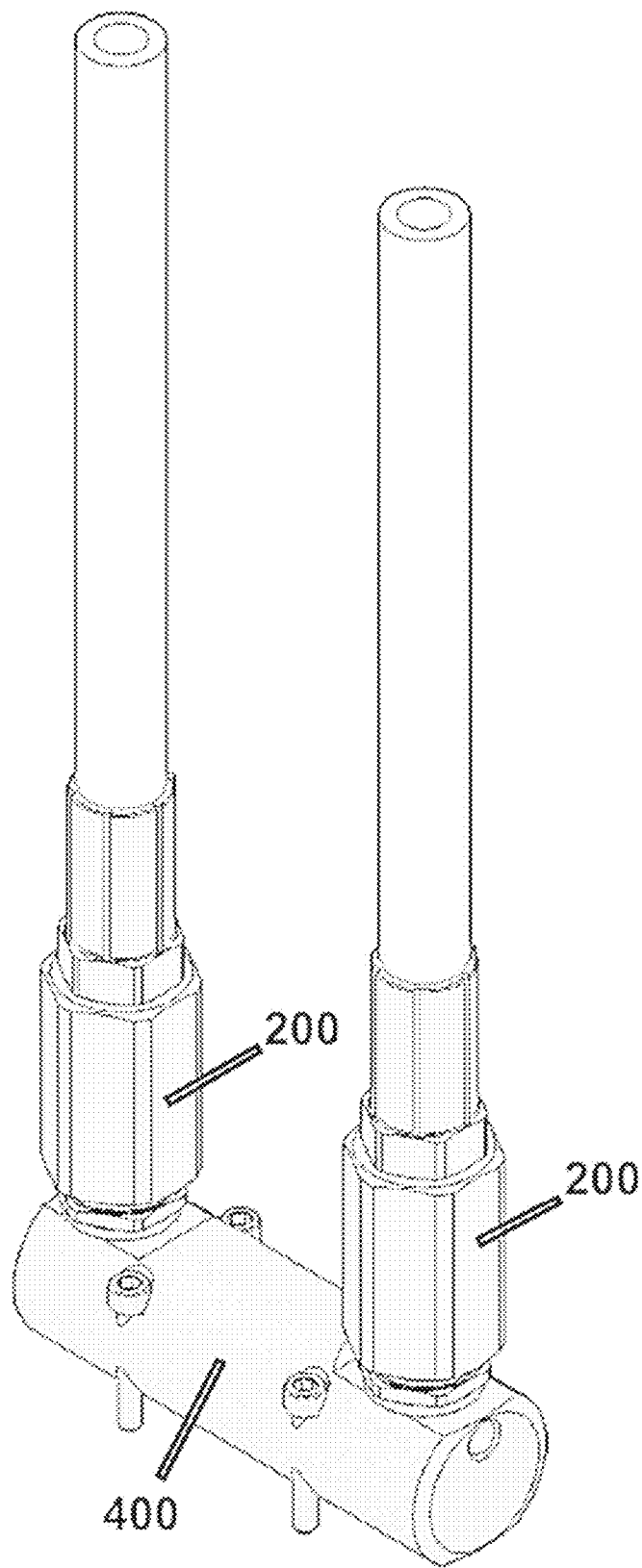
FIG. 20 shows the perspective view of the second embodiment of the valve assemble mounted on a manifold connected to a tank.
Figure 21:
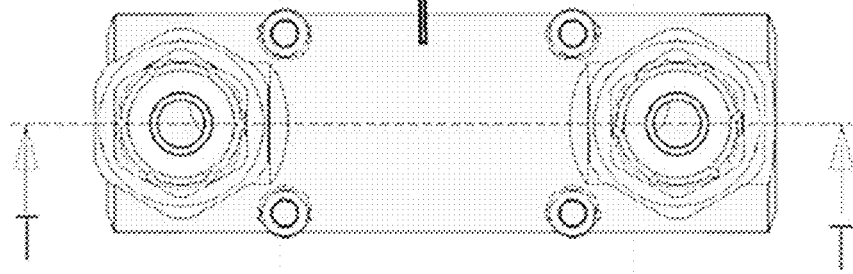
FIG. 21 shows the top view of the second embodiment of the valve assemble mounted on a manifold connected to a tank.
Figure 22:
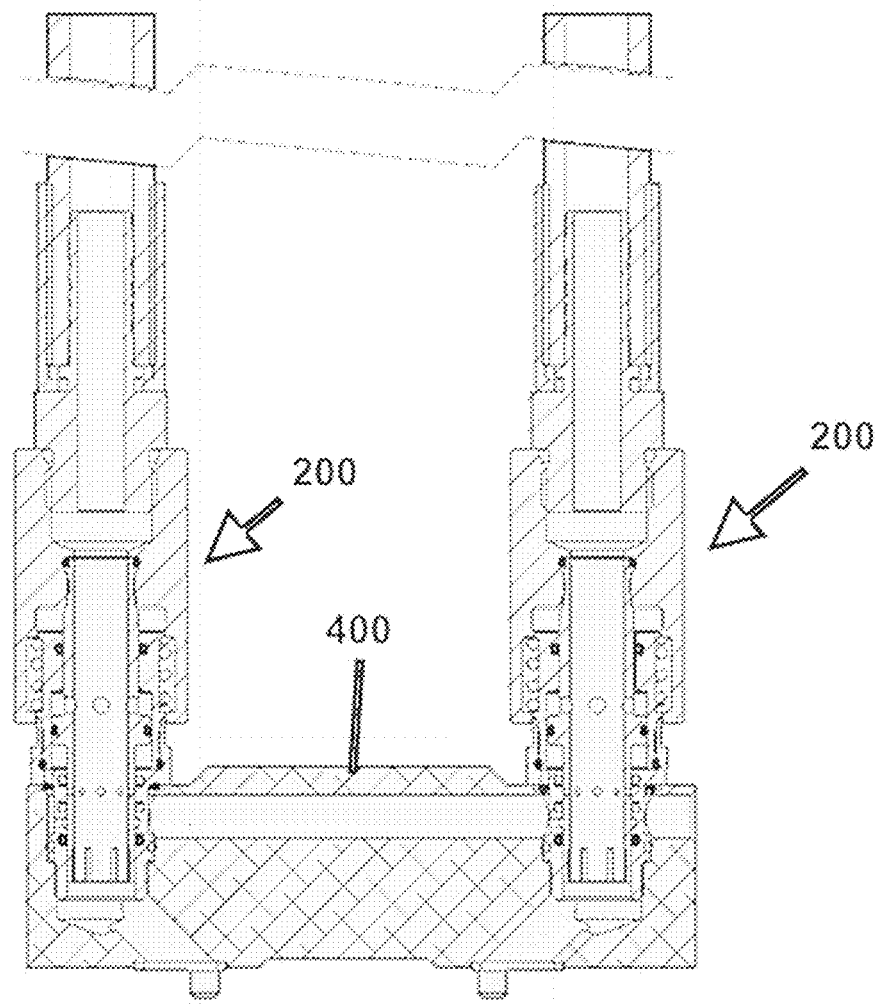
FIG. 22 shows a sectional view of the second embodiment of the valve assemble mounted on a manifold connected to a tank.

In addition, the valves (100) and (200) can be connected and mounted to a manifold (400) which eliminates the need for six components: threaded body (60), sealing element (61), manifold (20), terminal (21), sealing ring (22) and hose connected to tank, as shown in FIGS. 20, 21 and 22.

Optionally, the cob-shaped connection (21) can be replaced by any coupling model having connection to the tank.

Optionally, the gantry (40) can have other embodiments so that it can be constituted by two pieces fitted together.

The invention claimed is:

1. A hydraulic pressure relief depressurization valve assembly for quick coupling comprising a directional fluid body (10) which has grooves in its outer portion enabling an arrangement of sealing elements (11 and 12) along with the attachment of a tank access manifold (20), at an inner portion of the directional fluid body (10) are arranged first and second grooves (13 and 14) interspersed by a pressurized seal (15), a rear directional coupling seal (16), a lower directional coupling seal (17) and a depressurization safety seal (18), wherein either connecting and/or disconnecting a hose allows for directing a fluid to the tank access manifold (20) through the first and second grooves (13 and 14);

the tank access manifold (20) defining an upper hole that receives an access terminal (21), the access terminal (21) being fitted and sealed to the tank access manifold (20) through an access terminal sealing ring (22), the tank access manifold (20) fitted over the directional fluid body (10), the tank access manifold (20) and the directional fluid body (10) together forming a relief chamber (23), wherein the relief chamber (23) is interconnected with the first and second grooves (13 and 14) and is sealed by the pressurized seal (15) and the depressurization safety seal (18);

an intermediate sleeve (30) provided in its outer portion with a spring groove allowing for the disposition of a spring (31) and a vent protector groove that receives a vent protector (32) and in its inner portion the intermediate sleeve has and intermediate seal (33) arranged with a relief valve (50), the intermediate sleeve (30) which is fitted and fixed superimposed on an end of the directional fluid body (10), leaning against the tank access manifold (20);

a coupling gantry (40) which is fitted and fixed superimposedly on an end of the intermediate sleeve (30), together with the intermediate sleeve (30) forming a spring chamber (41) that houses the spring (31) and in an inner portion of the coupling gantry (40) is a sealing ring (42) fixed to an inner frame (50);

the relief valve (50) provided with a seal (51) arranged in a central portion, a set of directional fluid holes (52) and a set of holes (53) of larger diameter for valve equalization, the relief valve (50) having in its central portion a passage section (54) of pressurized fluid;

the seal (51) is arranged next to a chamber (34) formed by a junction of the intermediate sleeve (30) with the directional fluid body (10), the chamber (34) having a vent hole (35) arranged next to the vent protector (32) depicted on the outer portion of the intermediate sleeve (30);

the relief valve (50) when at rest keeps the set of directional fluid holes (52) aligned on the inner portion of the directional fluid body (10), and the set of holes (53) is arranged between the rear directional coupling and lower directional coupling seals (16 and 17) and between the first and second grooves (13 and 14), keeping a line pressurized;

when the relief valve (50) is moved, through an action of pushing the coupling gantry (40), the set of directional fluid holes (52) are displaced along the first groove (13) between the pressurized and rear directional coupling seals (15 and 16) and the seal (51) and the set of holes (53) are displaced inside the chamber (34) in order to relieve a pressure in the line, directing the fluid back to a tank through the access terminal (21) allowing air to exit the vent hole (35) when connecting the hose to the coupling gantry (40); and when the relief valve (50) is moved through an action of pulling the coupling gantry (40), the set of directional fluid holes (52) are displaced along with the second groove (14) between the lower directional coupling and depressurization safety seals (17 and 18) in order to relieve the pressure, directing the fluid to return to the tank through the access terminal (21) when disconnecting the hose from the coupling gantry (40).

2. The hydraulic pressure relief depressurization valve assembly for quick coupling, according to claim 1, wherein the relief chamber (23) allows directing the pressurized fluid back to the tank, relieving the pressure along the relief valve.

3. The hydraulic pressure relief depressurization valve assembly for quick coupling, according to claim 1, wherein an axial movement of the relief valve (50) together with the hydraulic pressure relief depressurization valve assembly (100) occurs through the seal (51) arranged with the chamber (34).

4. The hydraulic pressure relief depressurization valve assembly for quick coupling, according to claim 1, wherein the set of holes (53) of greater dimension are arranged next to the seal (51) and also move within the chamber (34), and the set of holes (53) are intended to equalize the pressure of the relief valve (50) when there is pressure in the hydraulic pressure relief depressurization valve assembly, avoiding involuntary axial movement.

5. The hydraulic pressure relief depressurization valve assembly for quick coupling, according to claim 1, wherein the pressurized seal (15), rear directional coupling seal (16), lower directional coupling seal (17), intermediate seal (33) and seal (51) are accompanied by a backup ring.

6. The hydraulic pressure relief depressurization valve assembly for quick coupling, according to claim 1, wherein the hydraulic pressure relief depressurization valve assembly (100) is formed by the directional fluid body (10), the tank access manifold (20), the intermediate sleeve (30), the coupling gantry (40) and the relief valve (50), which is axial displacement equalized and relieves the pressure when connecting or disconnecting the hose along a line of the hydraulic pressure relief depressurization valve assembly.

7. The hydraulic pressure relief depressurization valve assembly for quick coupling, according to claim 1, wherein each of the pressurized seal (74), the directional coupling seal (75), the lower directional coupling seal (76), the intermediate seal (82) and the seal (91) are accompanied by a backup ring.

8. The hydraulic pressure relief depressurization valve assembly for quick coupling, according to claim 1, wherein the hydraulic pressure relief depressurization valve assembly (100 and 200) and the hose are installed in any coupling model and add one or more functions of connecting and disconnecting under pressure.

9. A hydraulic pressure relief depressurization valve assembly for quick coupling, comprising a threaded body (60) contacting the manifold, fitted and fixed to a directional fluid compact body (70), having a sealing element (61) between a fitting system;

the directional fluid compact body (70) having grooves in its outer portion that enable an arrangement of sealing elements (71 and 72) together with the attachment of a tank access manifold (20) and on an inner portion of the directional fluid compact body (70) a horizontal groove (73) is arranged which is interlocked with opening (731), interspersed by a pressurized seal (74), rear directional coupling seal (75) and lower directional coupling seal (76), said horizontal groove (73) is interlocked with the opening (731) for accessing a relief chamber (23) and next to a chamber (83) for moving a seal (91) of a relief valve (90);

the tank access manifold (20) defines an upper hole that receives an access terminal (21), the access terminal (21) which is fitted and sealed to the tank access manifold (20) through an access terminal sealing ring (22), the tank access manifold (20) being fitted over the directional fluid compact body (70), forming the relief chamber (23) which is interconnected to the horizontal groove (73) which is sealed by the arrangement of sealing elements (71 and 72);

the directional fluid compact body (70) fitting over an intermediate sleeve (80) having an intermediate sealing element (77), the chamber (83) connected to a tank;

the intermediate sleeve (80) that is provided in its outer portion with a spring groove allowing an arrangement of a spring (81) and in its inner portion the intermediate sleeve has an intermediate seal (82) arranged with the relief valve (90), being fitted and fixed together to the fluid directional compact body (70), being sealed through the intermediate sealing element (77);

a gantry coupling (40) having an embodiment that is fitted and fixed superimposed on an end of the intermediate sleeve (80), forming a spring chamber (41) that houses the spring (81) together with the intermediate sleeve (80), with a sealing ring (42) being attached to an internal valve (90) which is the relief valve (90) having the seal (91) arranged in a central portion, a set of directional fluid holes (92) and a set of holes (93) of greater diameter for equalizing the valve, the relief valve (90) having in its central portion a passage section (94) of the pressurized fluid;

when at rest, it keeps the set of directional holes (92) aligned on the inner portion of the fluid directional compact body (70) so that the set of directional holes (92) is arranged between the directional coupling seal (75) and the lower directional coupling seal (76) and between the hole (73) and the chamber (83), keeping a line pressurized; when the relief valve (90) is moved, through an action of pulling the gantry coupling (40), the set of directional fluid holes (92) are displaced along the chamber (83) directing the fluid to the horizontal groove (73), relieving the pressure and directing the fluid to return to the tank through the access terminal (21) in an action of disconnecting a hose with the gantry coupling (40); and when the relief valve (90) is moved through an action of pushing the gantry coupling (40), the set of directional fluid holes (92) are displaced along the opening (731) between the pressurized seal (74) and the directional coupling seal (75), directing the fluid to the horizontal groove (73) and the relief chamber (23), and a valve sealing element (72) closes a rear end of the horizontal groove (73) in order to prevent fluid from entering the chamber (83), relieving a line pressure and directing the fluid back to the tank through the access terminal (21).

10. The hydraulic pressure relief depressurization valve assembly for quick coupling, according to claim 9, wherein the horizontal groove (73) is interconnected to the opening (731), directing the fluid to the tank access manifold (20) both in the connection or disconnection action of the hose.

11. The hydraulic pressure relief depressurization valve assembly for quick coupling, according to claim 9, wherein the relief chamber (23) is interconnected to the horizontal groove (73) which is sealed by the arrangement of sealing elements (71 and 72), directing the fluid pressurized back to the tank in order to relieve the pressure at the valve.

12. The hydraulic pressure relief depressurization valve assembly for quick coupling, according to claim 9, wherein an axial movement of the relief valve (90) with the hydraulic pressure relief depressurization valve assembly (200) occurs through the seal (91) with the chamber (83) formed by joining the intermediate sleeve (80) to the directional fluid compact body (70).

13. The hydraulic pressure relief depressurization valve assembly for quick coupling, according to claim 9, wherein the set of holes (93) of greater dimension are arranged next to the seal (91) and also move within the chamber (83), and the set of holes (93) is intended to equalize the pressure of the relief valve (90) when the axial movement is performed.

14. The hydraulic pressure relief depressurization valve assembly for quick coupling, according to claim 9, wherein the hydraulic pressure relief depressurization valve assembly (200) is formed by the threaded body (60) contacting a block, the tank access manifold (20), the fluid directional compact body (70), the intermediate sleeve (80), the gantry coupling (40) is a hydraulic system gantry coupling (40) and the relief valve (90) is an axial displacement equalized relief valve (90) allowing for the pressure relief in the connection and disconnection action along a line of hydraulic systems.

15. The hydraulic pressure relief depressurization valve assembly for quick coupling, according to claim 9, wherein the hydraulic pressure relief depressurization valve assembly (100 and 200) and the hose are installed in any coupling model.

* * * * *